United States Patent

[11] 3,617,255

| [72] | Inventor | Johan Elof Wiklund<br>Halsingborg, Sweden |
|---|---|---|
| [21] | Appl. No. | 724,263 |
| [22] | Filed | Apr. 25, 1968 |
| [45] | Patented | Nov. 2, 1971 |
| [73] | Assignee | Boliden Aktiebolag<br>Stockholm, Sweden |

[54] PROCESS FOR REPRESSING SULFUR TRIOXIDE FORMATION IN IRON SULFIDE ROASTING
1 Claim, No Drawings

[52] U.S. Cl. .................................................. 75/9
[51] Int. Cl. .................................................. C21b 1/02, C22b 1/10
[50] Field of Search ...................................... 75/9

[56] References Cited
UNITED STATES PATENTS

| 1,941,592 | 1/1934 | Bacon et al. .................. | 75/9 |
| 2,090,386 | 8/1937 | Ferguson ...................... | 75/9 |
| 3,047,365 | 7/1962 | Jukkola ........................ | 75/9 X |
| 3,169,853 | 2/1965 | Van Es ......................... | 75/9 |
| 3,198,602 | 8/1965 | Wittmann ..................... | 75/9 X |
| 3,386,815 | 6/1968 | Gorling et al. ................ | 75/9 |

FOREIGN PATENTS

| 917,480 | 2/1963 | Great Britain ................ | 75/9 |

*Primary Examiner*—Allen B. Curtis
*Attorney*—Stevens, Davis, Miller & Mosher

ABSTRACT: A process for magnetite-yielding roasting of sulfide-containing materials for repressing the formation of $SO_3$ in the resulting roaster gas; the process comprising the step of introducing an oxygen-containing gas into the roaster gas for combustion of elementary sulfur at a gas temperature of below 420° C. but not below the temperature at which the sulfur content of the roaster gas begins to condensate.

PROCESS FOR REPRESSING SULFUR TRIOXIDE FORMATION IN IRON SULFIDE ROASTING

The present invention pertains to a process of reducing the formation of $SO_3$ in roaster gases when roasting pyrites in a fluidized bed in such a manner that the roasting gases will contain a significant amount elementary sulfur which is combusted by adding oxygen to the roaster gases. Such a method is described in the British Pat. No. 917,480.

Roasting according to said method is conducted at such low oxygen-partial pressure that the roasted product is present completely or partly as magnetite, elementary sulfur appearing in the roaster gas in large or small amounts.

To avoid inconveniences in the further treatment of the roaster gas and to recover the sulfur content thereof said sulfur pursuant to the said method must be combusted by adding oxygen-containing gas to the roaster gases.

During the roasting process, which usually takes place at temperatures ranging from 700° to 1100° C., the gases leave the furnace at high temperatures and the roasted product entrained therewith is suitably separated inside or outside the furnace. It is essential that the temperature of the gas during this separation process is maintained higher than the condensation temperature of the elementary sulfur included in the gas. Subsequent to the separation process the hot roaster gas has a temperature which is only somewhat less than the roasting temperature, and consequently must be cooled before subjected to further treatment.

Large capacity roasting plants are often equipped with a waste heat boiler for cooling the gas and simultaneously recovering its heat content.

With respect to the risks of $SO_3$ forming as a result of adding oxygen to the roaster gases the place and temperature at which the combustion of the elementary sulfur takes place cannot be considered unimportant. If the oxidized gas is added at high temperatures and the roaster gases contain $Fe_2O_3$ and an excess of oxygen, $SO_3$ will be formed during the cooling of the gas. In this instance the magnetite dust, oxidized to $Fe_2O_3$, acts as a catalyst. The formation of $SO_3$ is not desirable since it is responsible for several disadvantages. When the gas is cooled in waste heat boiler these disadvantages can be summarized as follows:

1. The waste heat boiler becomes loaded with a large amount of gas which under certain conditions causes increased heat losses.
2. Iron sulfate is formed and $SO_2$ losses occur because of the oxidized atmosphere formed after the air is added.
3. Sulfatized iron oxide has a greater tendency to adhere to the tubes of the waste heat boiler than iron oxide, the coefficient of heat transfer being impaired and causing difficult cleaning problems.
4. Sulfuric acid of insignificant or no value appears in the washing stage owing to the absorption of $SO_3$ formed in the roaster gas, and in such instances when the starting material contains arsenic the arsenic becomes incorporated in the acid-washing liquid, which because of health reasons can only be used with difficulty.

To circumvent these and other disadvantages it has been found advantageous to conduct the step of after-combustion subsequent to the roaster gases being cooled to a temperature below 420° C., at which temperature the sulfur can be combusted and the formation of $SO_3$ kept to a minimum, as a result of the low temperature. On the other hand the temperature must not fall below the condensation temperature of elementary sulfur, at the sulfur concentration prevailing in the roaster gas.

EXAMPLE

An arsenic-containing pyrite concentrate was roasted according to British Pat. No. 917,480 in a plant for producing 500 tons of sulfuric acid per calender day. Subsequent to leaving the roasting furnace, which was a fluidized bed furnace of the BASF type, the gas was cooled, subsequent to the roasted product being separated in heat cyclones, in a waste heat boiler, whereupon the gas was purified in an electrofilter. The air for combusting elementary sulfur was introduced into a combustion chamber immediately after the heat cyclones but before the waste heat boiler.

The following problems arose:

1. Difficulties in maintaining gas departing from the waste heat boiler at the temperature which could be permitted with respect to the function of the electrofilter, owing to the fact that iron oxide dust remaining in the roaster gas-coated the tube surfaces of the boiler causing a strong sulfatization of the iron oxide, whereby the coefficient of heat transfer of the gas relative to the tube surfaces was lowered considerably. Despite subjecting the tube surfaces to heavy and continuous blows the coatings could not be displaced.

2. In that the gas while being cooled passed the temperature range at which formation of $SO_3$ easily occurs and at the same time iron (III) oxide was present, a quantity of the acid washing liquid was obtained which comprises as much as 4 percent of the total sulfuric acid production, i.e., 20 tons per day calculated as 100 percent sulfuric acid. Since practically all of the arsenic content was dissolved in the acid-washing liquid the problem was presented of finding a replacement for the said quantity of acid. Furthermore, the plant was provided with apparatus for recovering arsenic from the washing acid and the yield of recovered arsenic is directly dependent upon as little acid-washing liquid being formed as possible.

Subsequent to the apparatus being modified so that after-combustion of elementary sulfur took place behind the steam boiler but before the electrofilter the aforementioned disadvantages were no longer apparent. Also, subsequent to the said modification, the production of steam was increased, there was no need for hammering means in the steam boiler, dust separated in the waste heat boiler and electrofilter could be intermixed into the iron oxide product obtained without unduly impairing the quality of the same, and the production of dirty and weak acid-washing liquid was avoided. Furthermore, the arsenic present in the pyrite could be separated to almost 100 percent in concentrated and solid form in the gas washing plant. The recovered dust had a high magnetite content and a low sulfate content and was more suitable for handling and transporting purposes.

Naturally the addition of air could also have been conducted after the electrofilter, where the temperature also permitted combustion of sulfur vapor, providing that the electrofilter is constructed for purifying gases having such high percentages of $SO_2$.

If after-combustion is conducted according to the present invention the necessity of separating the roasted products is, moreover, less before the waste heat boiler since, owing to the prevailing low oxygen-partial pressure, the arsenic is forced through the dry gas purifying apparatus without it being possible to form iron arsenate, and since that arsenic trioxide at prevailing temperatures in the electrofilter is present in gas form; the arsenic to a large extent being entrained to the washing plant. The dust falling in the waste heat boiler and electrofilter is thus relatively free from arsenic.

What is claimed is:

1. In the process of one-step roasting iron sulfide containing materials in a fluidized bed furnace at temperatures from 700° to 1100° C. at a low oxygen partial pressure to form a magnetite roasted product and roasted gases containing elemental sulfur and ferric oxide, the improvement which comprises cooling said roaster gases in a waste heat boiler to a temperature below 420° C. but not below the temperature at which the sulfur content of the roaster gases begins to condense, and thereafter introducing oxygen into said roaster gases to effect combustion of said sulfur whereby formation of $SO_3$ is repressed.

* * * * *